United States Patent
Kucherov et al.

(10) Patent No.: US 11,086,793 B2
(45) Date of Patent: Aug. 10, 2021

(54) DATA REDUCTION TECHNIQUES FOR USE WITH CACHING

(71) Applicant: EMC IP Holding Company LLC, Hopkinton, MA (US)

(72) Inventors: Anton Kucherov, Dudley, MA (US); David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 86 days.

(21) Appl. No.: 16/743,034

(22) Filed: Jan. 15, 2020

(65) Prior Publication Data
US 2021/0216475 A1    Jul. 15, 2021

(51) Int. Cl.
*G06F 12/123* (2016.01)
*G06F 12/0846* (2016.01)
*G06F 12/0875* (2016.01)

(52) U.S. Cl.
CPC ........ *G06F 12/123* (2013.01); *G06F 12/0848* (2013.01); *G06F 12/0875* (2013.01); *G06F 2212/452* (2013.01); *G06F 2212/604* (2013.01)

(58) Field of Classification Search
CPC ............... G06F 12/123; G06F 12/0848; G06F 12/0875; G06F 2212/452; G06F 2212/604; G06F 3/0656; G06F 12/0866–0873
See application file for complete search history.

(56) References Cited

U.S. PATENT DOCUMENTS

| | | | |
|---|---|---|---|
| 9,606,870 B1 | 3/2017 | Meiri et al. | |
| 2001/0001872 A1* | 5/2001 | Singh | G06F 12/0802 711/129 |
| 2005/0198062 A1* | 9/2005 | Shapiro | G06F 16/2282 |
| 2009/0132770 A1* | 5/2009 | Lin | G06F 12/0886 711/154 |
| 2012/0210066 A1* | 8/2012 | Joshi | G06F 12/0811 711/118 |
| 2016/0335188 A1* | 11/2016 | Romanovskiy | G06F 3/064 |

* cited by examiner

*Primary Examiner* — Charles Rones
*Assistant Examiner* — Hewy H Li
(74) *Attorney, Agent, or Firm* — Muirhead and Saturnelli, LLC

(57) ABSTRACT

Techniques for cache management may include: partitioning a cache into buckets of cache pages, wherein each bucket has an associated cache page size and each bucket includes cache pages of the associated cache page size for that bucket, wherein the cache includes compressed pages of data and uncompressed pages of data; and performing processing that stores a first page of data in the cache. The processing may include storing the first page of data in a first cache page of a selected bucket having a first associated cache page size determined in accordance with a first compressed size of the first page of data. The cache may be repartitioned among the buckets based on associated access frequencies of the buckets of cache pages.

20 Claims, 9 Drawing Sheets

DATA REDUCTION TECHNIQUES FOR USE WITH CACHING

BACKGROUND

Technical Field

This application generally relates to data storage and, more particularly, to data reduction techniques used with caching.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for cache management comprising: partitioning a cache into a plurality of buckets of cache pages, wherein each of the plurality of buckets has an associated cache page size and said each bucket includes a plurality of cache pages each of the associated cache page size for said each bucket, wherein the cache includes compressed pages of data and uncompressed pages of data; and performing processing that stores a first page of data in the cache, said processing including: storing the first page of data in a first cache page of a selected bucket of the plurality of buckets having a first associated cache page size determined in accordance with a first compressed size of the first page of data.

In at least one embodiment, the techniques may include receiving at least one access frequency metric for each of the plurality of buckets; determining, in accordance with the at least one access frequency metric for each of the plurality of buckets, whether to repartition the cache among the plurality of buckets; and responsive to determining to repartition the cache among the plurality of buckets, performing cache repartitioning, wherein said cache repartitioning includes reallocating at least a first portion of the cache from a first of the plurality of buckets to a second of the plurality of buckets in accordance with the at least one access frequency metric for each of the plurality of buckets. The cache repartitioning may include determining the first bucket as a donor bucket from which the first portion of the cache is selected; and determining the second bucket as a receiving bucket to which the first portion of the cache is reallocated from the first bucket. Determining whether to repartition the cache may further comprise: determining a first access frequency metric for the first bucket of cache pages exceeds a specified threshold of allowable variation or difference; and responsive to determining the first access frequency metric for the first bucket of cache pages exceeds the specified threshold of allowable variation or difference, determining to repartition the cache among the plurality of buckets and performing said cache repartitioning.

In at least one embodiment, the techniques may include determining that the first access frequency metric indicates that the first bucket has a lower access frequency than any other of the plurality of buckets. Determining whether to repartition the cache may further comprise: determining a second access frequency metric for the second bucket of cache pages exceeds a specified threshold of allowable variation or difference; and responsive to determining the second access frequency metric for the first bucket of cache pages exceeds the specified threshold of allowable variation or difference, determining to repartition the cache among the plurality of buckets and performing said cache repartitioning. It may be determined that the second access frequency metric indicates that the second bucket has a higher access frequency than any other of the plurality of buckets. The first portion of the cache may be determined as a least recently used cache portion of the first bucket. Each of the plurality of buckets may have a different associated cache page size. The plurality of buckets may include one bucket of cache pages including the uncompressed pages of data, wherein other ones of the plurality of buckets of cache pages may be used to store the compressed pages of data, and wherein the other ones of the plurality of buckets may include different sizes of compressed cache pages. The processing that stores a first page of data in the cache may further comprise: determining whether an associated access frequency for the first page of data exceeds a threshold; responsive to determining the associated access frequency for the first page of data exceeds the threshold, storing the first page of data in a cache page of said one bucket of cache pages used to store the uncompressed pages of data; and responsive to determining the associated access frequency for the first page of data does not exceed the threshold, performing said storing the first page of data in the first cache page of the selected bucket of the plurality of buckets having the first associated cache page size determined in accordance with the first compressed size of the first page of data, wherein the selected bucket is one of the other ones of the plurality of buckets.

In at least one embodiment, the at least one access frequency metric for each of the plurality of buckets may be determined in accordance with cache hits of said each bucket of cache pages. The at least one access frequency metric for each of the plurality of buckets may be determined by dividing the cache hits of said each bucket by a size of said each bucket denoting an amount of the cache allocated for said each bucket. The cache may include volatile memory. The cache may include non-volatile memory.

In at least one embodiment, the cache may be a read cache that includes only read data for read I/O operations. A write cache that is separate from the read cache may be used to store write data for write I/O operations.

In at least one embodiment, the cache may include data used in connection with read and write I/O operations.

In at least one embodiment, the at least one access frequency metric for each of the plurality of buckets may include a first access frequency metric determined in accordance with a number of pages in said each bucket having a number of cache hits or accesses below a specified threshold number of cache hits or accesses. The first bucket of the plurality of buckets may have a maximum value for the first access frequency metric with respect to said plurality of buckets. The first bucket may be selected as a donor bucket from which the first portion of the cache is selected, and wherein the second bucket of the plurality of buckets may have a minimum value for the first access frequency metric with respect to said plurality of buckets. The second bucket may be selected as a receiving bucket to which the first portion of the cache is reallocated.

In at least one embodiment, the cache may include a plurality of pages partitioned into the plurality of buckets. The processing may include receiving at least one access frequency metric for each of the plurality of pages; determining, in accordance with the at least one access frequency metric for each of the plurality of pages, a first portion of the plurality of pages to select as a plurality of donor pages; determining one or more receiving buckets; and moving the plurality of donor pages to the one or more receiving buckets.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
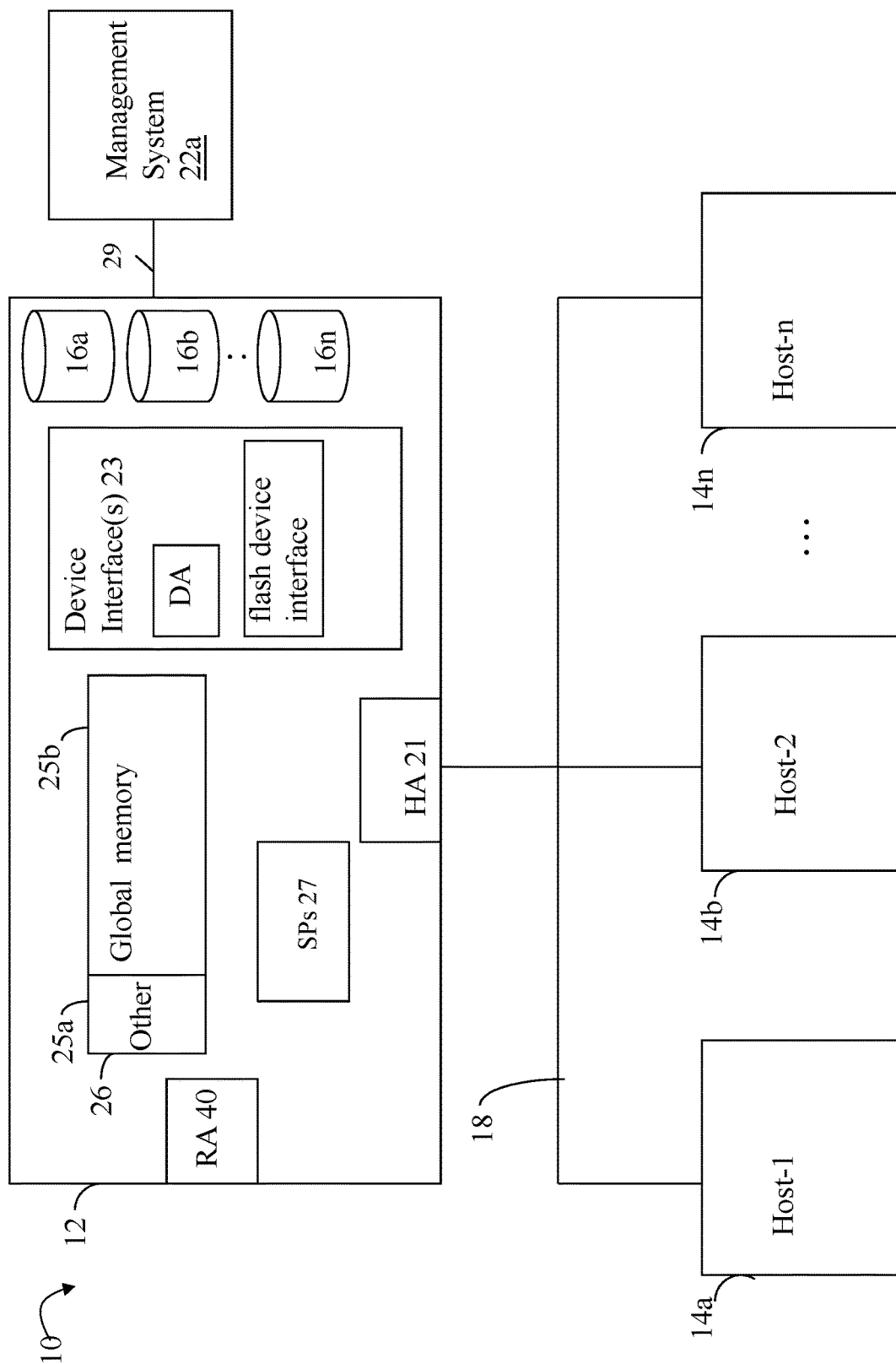
FIG. 1 is an example of components that may be included in a system in accordance with the techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI), file system-based protocols (e.g., NFS), and the like. Some or all of the connections by which the hosts 14a-14n and the data storage system 12 may be connected to the communication medium 18 may pass through other communication devices, such switching equipment that may exist such as a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of adapters or directors, such as an HA 21 (host adapter), RA 40 (remote adapter), and/or device interface or controller 23. Each of the adapters may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a system cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA, DA, RA, and the like, may be implemented as a hardware component including, for example, one or more processors, one or more forms of memory, and the like. Code may be stored in one or more of the memories of the component for performing processing.

The device interface or backend device controller, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, techniques herein may be used in connection with any suitable storage system, appliance, device, and the like, in which data is stored. For example, an embodiment may implement techniques herein using a midrange data storage system, such as a Dell EMC Unity® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on management system 22a to the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

In connection with a data storage system such as described herein, an I/O request may be a read request to read data. The read request may be received at the data storage system at a port of a front-end component of the data storage system (such as one of the HAs as described elsewhere herein). In terms of processing a read request (e.g. the read I/O path), a determination may be made as to whether all the requested read data is in cache (e.g., a cache hit where read data is stored in a data cache). If so, the read request may be characterized as a read hit, cache hit or read cache hit. In such cases of a read hit, the front-end component, such as the HA, receiving the read request may service the read request by retrieving all requested read data from the cache and returning the requested read data to the host. If all the requested read data is not in cache, the read may be characterized as a read miss (e.g., cache miss) whereby processing is performed to retrieve from physical storage any portion of the requested data that is not currently in cache. As described above, one or more DAs may perform processing to retrieve from physical storage any portion of the requested data not currently in cache. Once all the requested read data is in cache, the front-end component, such as the HA, receiving the read request may service the read request by retrieving all requested read data from the cache and returning the requested read data to the host. In this manner, a front-end component may service read requests using data that is already stored in cache prior to processing the read request, as well as using data that is brought into cache from physical storage responsive to receiving the read request.

Storing such data in cache is performed with the goal of servicing subsequent I/Os using cached data without having to retrieve the data from physical storage. In an embodiment in accordance with techniques herein, processing may be performed as just described to unconditionally cache reads as a result of a cache miss and to execute a dependent sequence of steps whereby the DA, or more generally a backend physical storage device controller, retrieves the requested data from a PD and writes the retrieved read miss data (retrieved from the PD) to the cache where the HA, or more generally front end component, then retrieves the requested data from the cache to return to the requesting host.

In connection with write operations and write I/O path processing, write data received at the data storage system may be stored in cache and then written out or destaged later to physical storage, such as written to backend physical storage devices by a DA. Once the write data is written into cache, the data may be marked as dirty or write pending (WP) in cache denoting that the cached write data is the most recent copy of the data and needs to be destaged to backend physical storage devices. The cache location including the WP data may marked as dirty thereby indicating that the cache location includes valid data and contains the most recent copy of the data but has not yet been synchronized with the copy on physical non-volatile storage of the back end PDs. Once the write data is written to cache, the data storage system may send an acknowledgement to the host that the write operation has been completed even though the write data may not have yet been destaged from cache to the backend physical storage devices. Once the WP data has been destaged from cache to physical storage, the cache location including the write data may be characterized as clean where the cache location is valid and contains a copy of write data that has been synchronized with backend physical storage.

As data for I/Os and other processing is stored in the cache, a cache memory location, such as a cache slot or cache page, may be allocated for use in storing such data. At various points in time, there may not be any free or available cache or the amount of free or available cache may reach a minimum threshold level. In response to such conditions and possibly others, processing may be performed in connection with cache management to obtain a free or available cache location such as by evicting one or more cache pages. Generally, any suitable cache management technique known in the art may be used to manage the cache. For example, an embodiment may use the least recently used (LRU) cache management technique which may remove data from cache based on when the data has been last referenced. For example, a time stamp may be associated with each data portion stored in the cache where the time stamp denotes the last time (e.g., date, hour, minutes, seconds in terms of wall clock time) the data portion was referenced. The most recently referenced data may have the most recent time stamp and may remain in the cache longer than other data referenced having older time stamps. The foregoing time stamps may be used to select particular data for eviction when a new cache location is needed to store new data. The foregoing time stamps may also be used in a proactive cache management technique, for example, to select data for removal when the amount of free or available cache falls below a specified amount. Data may be removed from the cache by destaging pending write data, evicting data from one or more cache pages that are the least recently used with respect to cached data, and the like.

Although not illustrated in FIG. 1 for simplicity, an embodiment may store additional information for cached data, such as read and write data described above that may be stored in the data cache. For example, for a particular LUN and offset, such additional information may map the particular LUN and offset to a cache location containing the data for that LUN and offset. Such additional information may also, for example, map a particular PD and PD offset to a cache location containing the data for that PD and offset. Generally, such additional information may be stored in any suitable location and used, for example, by the HA, DA and other data storage system components and executing code, as an index to map into the cache to retrieve and/or store data from the cache. For example, the HA may manage and/or use cache mapping information that maps a LUN and LUN offset to a cache location including data stored at the LUN offset on the particular LUN. The DA may manage and/or use cache mapping information mapping a PD and offset on the PD to a cache location including data stored at the offset on the particular PD for use in destaging write data from cache to backend non-volatile PDs 16a-n.

Data storage systems may include different storage tiers having different types of non-volatile storage media. For example, as noted above, in at least one embodiment, the data storage system may include one or more tiers of rotating disk drives and include a tier of SSD drives (e.g., flash-based storage drives). Data portions may be proactively moved or relocated between different storage tiers. For example, consider a multi-tiered storage system with 3 storage tiers—an SSD tier of flash-based drive, a tier of 15K RPM rotating disk drives and a tier of 10K RPM rotating disk drives. The foregoing 3 storage tiers may be ranked based on performance where the SSD tier may be ranked as the highest, the tier of 15K RPM drives ranked second highest and the tier of 10K RPM dries ranked lowest/least in terms of performance. A data portion, such as mapped to a subrange of a LUN logical address space, may be relocated between different ones of the foregoing 3 tiers in an automated fashion based on the temperature or frequency of access of I/Os to the data portion at various points in time. At a first point in time, the data portion may be accessed frequently for reading and/or writing and may be stored in the SSD tier. At a second later point in time, the data portion's frequency of access may be greatly reduced (e.g., idle) and may be relocated, via demotion, from the SSD tier to a lower performing tier, such as the 10K or 15K RPM tier. At yet a third point in time subsequent to the second point in time, the data portion may be frequently accessed again and may be promoted to a higher performing tier (e.g., relocated from the 10K or 15K RPM tier to the SSD tier). In at least one embodiment, the data storage system may include multiple SSD tiers of non-volatile storage where each of the SSD tiers has different characteristics that affect latency when accessing the physical storage media to read or write data.

Figure 2:
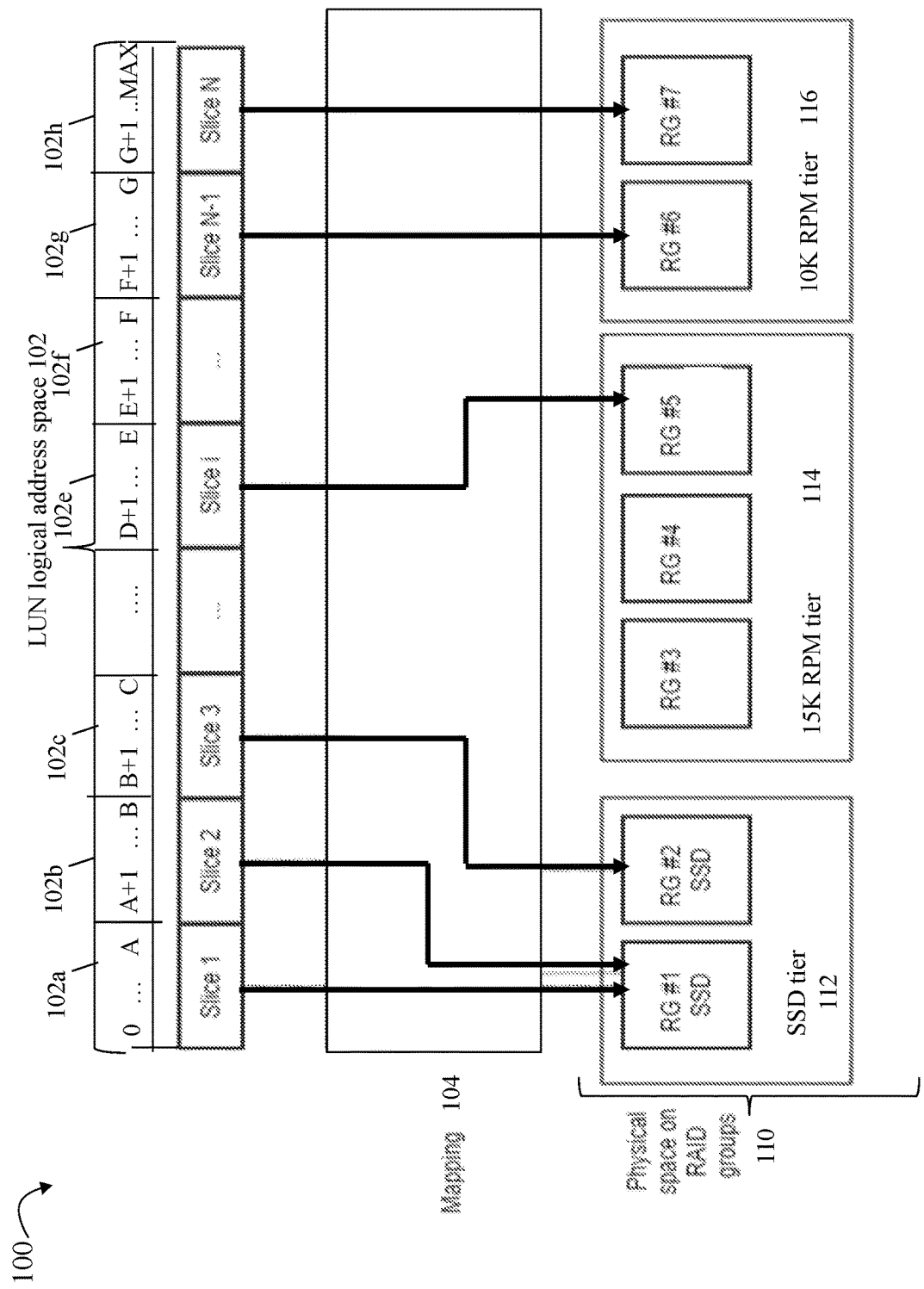
FIG. 2 is an example illustrating logical to physical mapping that may be used in an embodiment in accordance with the techniques herein.

Referring to FIG. 2, shown is an example illustrating logical to physical mapping in a data storage system. The example 100 illustrates how the logical address space or range of a LUN 102 is mapped via mapping layer 104 to different slices, segments or more generally, portions of physical memory of non-volatile physical storage devices (110) providing back-end data storage, such as denoted by PDs 16a-n in FIG. 1. The example 100 include storage tiers 112 (SSD tier), 114 (15K RPM tier) and 116 (10K RPM tier) comprising the PDs 110 as noted above. Element 102 may denote the LUN's logical address space, having a starting logical address, block or offset of 0, and an ending maximum logical address, MAX. The LUN's logical address space 102 in the example 100 is partitioned into equal logical address space portions (denoted by 102a-h) where each of the portions 102a-h is mapped to region of physical storage, also referred to as slices or segments, on the different PDs of different ones of the storage tiers of 110. As noted above, data storage system software may periodically remap portions of the LUN's logical address space to keep the most actively used or accessed portions of 102a-n on slices of the highest performance tier 112 in efforts to maximum data storage system I/O performance. As shown in FIG. 2, PDs of the tiers 112, 114 and 116 may be configured into RAID groups (denoted as RG #1-7 in FIG. 2) each having a suitable RAID level to provide data protection.

In connection with user data that is written to a LUN and then stored on the PDs, or more generally, back-end non-volatile storage devices, various types of metadata (MD) may also be stored. The MD may include, for example, various structures used to access the stored user data, attributes about the LUN, and the like. To further illustrate, the MD for a LUN may include location information identifying where the user data is stored on physical storage such as disks or flash-based non-volatile storage. Consistent with discussion herein, the data storage system may receive a host I/O that reads or writes data to a target location expressed as a LUN and offset, logical address, track, etc. on the LUN. The target location is a logical LUN address that may map to a physical storage location where data stored at the logical LUN address is stored. Thus, one type of MD for an LBA of a LUN may include location MD identifying the physical storage location mapped to the particular LBA.

Figure 3:
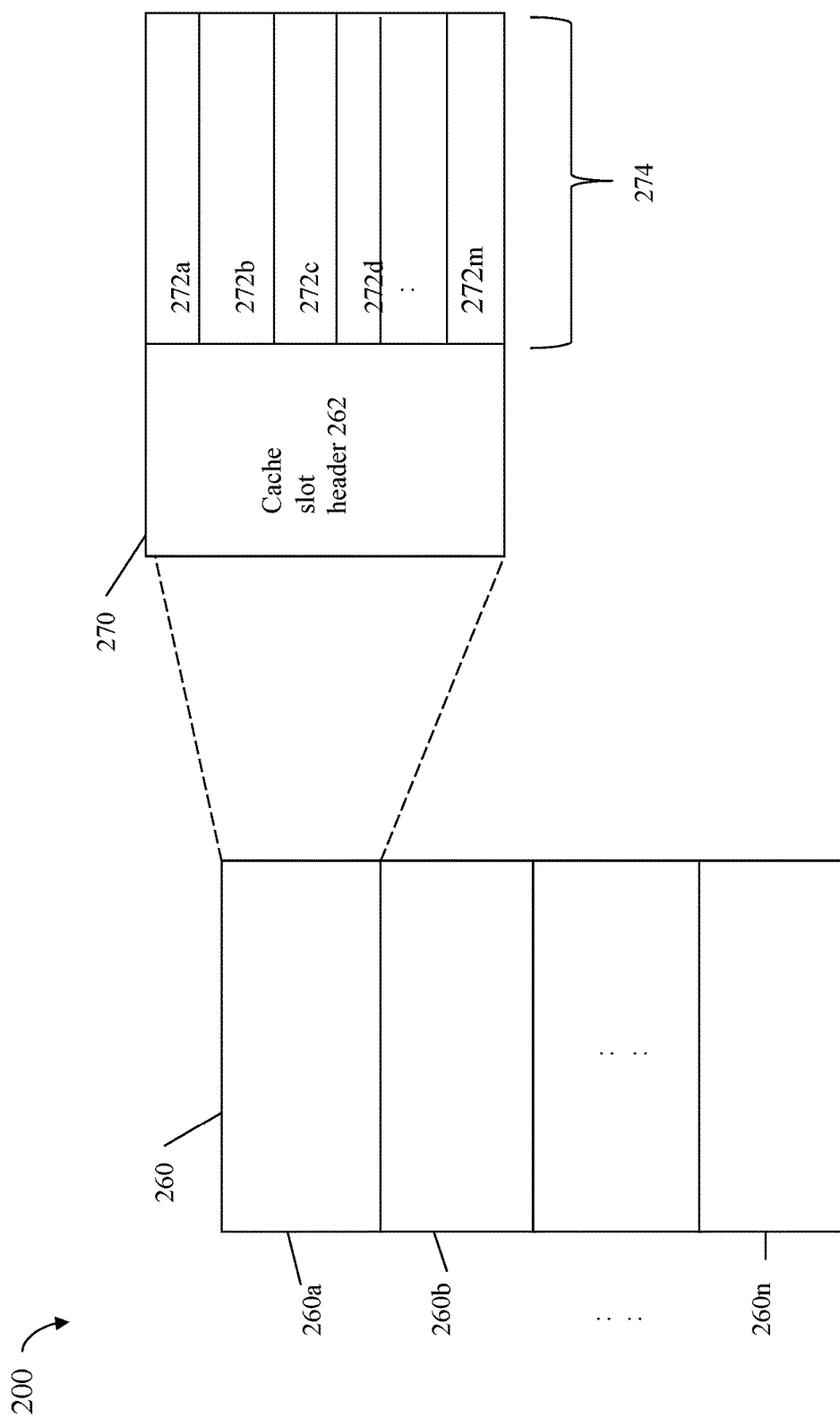
FIGS. 3 and 5 are examples illustrating logical representations of a cache in an embodiment in accordance with the techniques herein.

Referring to FIG. 3, shown is an example illustrating a logical representation of a cache that may be used in an embodiment in accordance with techniques herein. In the example 200, element 260 may represent the memory or storage used as the cache which is partitioned into cache slots or pages 260a-260n. It should be noted that the example 250 is a logical representation of a cache that may be implemented using any suitable data structure(s) known in the art. Element 270 provides additional detail of single cache slot or page 260a. The cache slot or page 260a may include a cache slot or page header 262 and cache slot or page data 274. The cache slot data 274 illustrates that a single cache slot or page of data may further include multiple portions 272a-m. The cache slot header 262 may include additional information regarding the cached data stored in 274. For example, the header 272 may denote whether the data cached in each of the portions 272a-m is write pending (WP) or dirty cached data.

It should be noted that the particular granularity or smallest unit of storage for storing cached data may vary with embodiment. For example, each of the portions 272a-m may denote a smallest unit of storage for storing cached data. Additionally, the particular number of portions in a cache slot may also vary with embodiment.

When performing various data storage services or processing I/O operations that access data stored on a LUN, data read from and/or written to a LUN may be processed using the typical I/O or data path such as described herein. For example, consistent with other discussion herein, when reading data from a LUN of the data storage system, the data may be read from the LUN, stored in the cache of the data storage system, and then further read from the cache for use by one or more other components of the data storage system. For example, data may be read from a LUN in response to a read I/O from a client, such as an external host. The data may result in a cache miss wherein the requested read data is read from a backend PD and then stored in the cache. The read data stored in the cache may then be read by another component, such as a front end component that is an HA or an FA, that returns the read data from the cache to the client that issued the read I/O operation.

Data storage systems may also perform data services selected for use in connection with user data stored on LUNs, and thus PDs, of the data storage system. For example, in at least one embodiment in accordance with the techniques herein, the data storage system may perform one or more data reduction operations, such as data compression and decompression. Such data reduction operations attempt to reduce the amount of storage needed for storing data on non-volatile backend storage devices (e.g., PDs) with the goal of reducing the cost per unit of storage consumed (e.g., dollar cost per GB of storage). In at least one embodiment, the compression technique may be a lossless compression technique such as an algorithm from the Lempel Ziv algorithm family (e.g., LZ77, LZ78, LZW, LZR, and the like).

When organizing a cache, such as one including at least read data used in connection with read I/O operations, some existing systems may store compressed data on the backend non-volatile storage PDs and may store the data in its uncompressed form in the cache. For example, in response to a read miss (or read cache miss) where read data requested for a read I/O operation is not in the cache, the requested read data may be read from a backend PD where the read data is stored in its compressed form. The compressed form of the read data obtained from the PD may be decompressed whereby the decompressed or uncompressed form of the read data is then stored in the cache. The decompressed form of the read data may then be returned to the requesting client that issued the read I/O operation.

Some existing systems store cached data in its uncompressed form rather than compressed form for various reasons. For example, one reason is that cached data may be subsequently modified and the compressed form of the data after modification may have a different, larger compressed size than the compressed form of the data prior to the modification. In this case, the compressed data after the modification no longer fits into its current cache location and requires relocation to a different larger cache location. Additionally, removing such cached compressed data from the current cache location may leave a hole or portion of free cache located between other portions of cached data. In order to efficiently use the cache, additional cache management techniques may be used, for example, to defragment the cache on a regular basis. Such defragmentation may include locating holes of free cache locations, and relocating cached data in order to aggregate free cache locations together. Such defragmentation has drawbacks in that it is expensive by consuming additional processor time and may be error prone.

Described in the following paragraphs are techniques that may be used for storing I/O operation data in its compressed form in the cache. In at least one embodiment, the techniques prevent the occurrence of holes of free cache and provide for maintaining compressed data in the cache without the need to defragment to remove such holes. Such techniques provide for efficient use of the cache by effectively increasing the size of the cache through storing compressed data. For example, with a cache having an average compression ratio of 2:1 or 50% compression ratio, the cache is effectively doubled in size in that twice as much data may be stored in the cache. In at least one embodiment, a compression ratio may be expressed as a ratio of the size of a data portion stored in its uncompressed form with respect to the size of the data portion stored in its compressed form.

In at least one embodiment in accordance with the techniques herein, the cache may include a combination of compressed and uncompressed data. In at least one embodiment, the cache may include sections or buckets of cache pages. Each section or bucket has an associated cache page size and includes cache pages of the associate cache page size. For example, an embodiment may include a first section or bucket of cache pages of the size 8K bytes, a second section or bucket of cache pages of the size 4K bytes, and the possibly other additional sections or buckets of cache pages of different sizes. When storing compressed data in the cache, processing may select a particular cache section or bucket having an associated cache page size that can accommodate storing the compressed data. The page size may be the smallest page size available to accommodate the compressed data.

In at least one embodiment, the cache may be initially partitioned into a number of sections or buckets where each section or bucket is an initial size denoting an initial amount of the cache allocated for the bucket. As time progresses during operation of the system, cache repartitioning may be performed where the sections or buckets may be resized and adjusted dynamically based on one or more metrics. For example, if cache pages of a particular page size in a first section or bucket are used much less frequently than any other cache page sizes of other sections or buckets, the cache sections or buckets may be resized or repartitioned to reduce the total size and amount of cache allocated for the first section or bucket. In at least one embodiment, each of the sections or buckets of cache pages of a particular page size may be maintained as a list or other suitable structure.

The foregoing and other aspects of the techniques herein are described in more detail in the following paragraphs.

In at least one embodiment, each section or bucket of cache pages of a particular size may be managed as a list. Thus, each list includes entries that are cache pages of the same page size. In such an embodiment, the cache may be implemented using multiple lists of structures corresponding to cached pages of data. In at least one embodiment, each such list of cache pages of a particular size may be implemented as a double linked list although more generally any suitable structure may be used.

Figure 4:
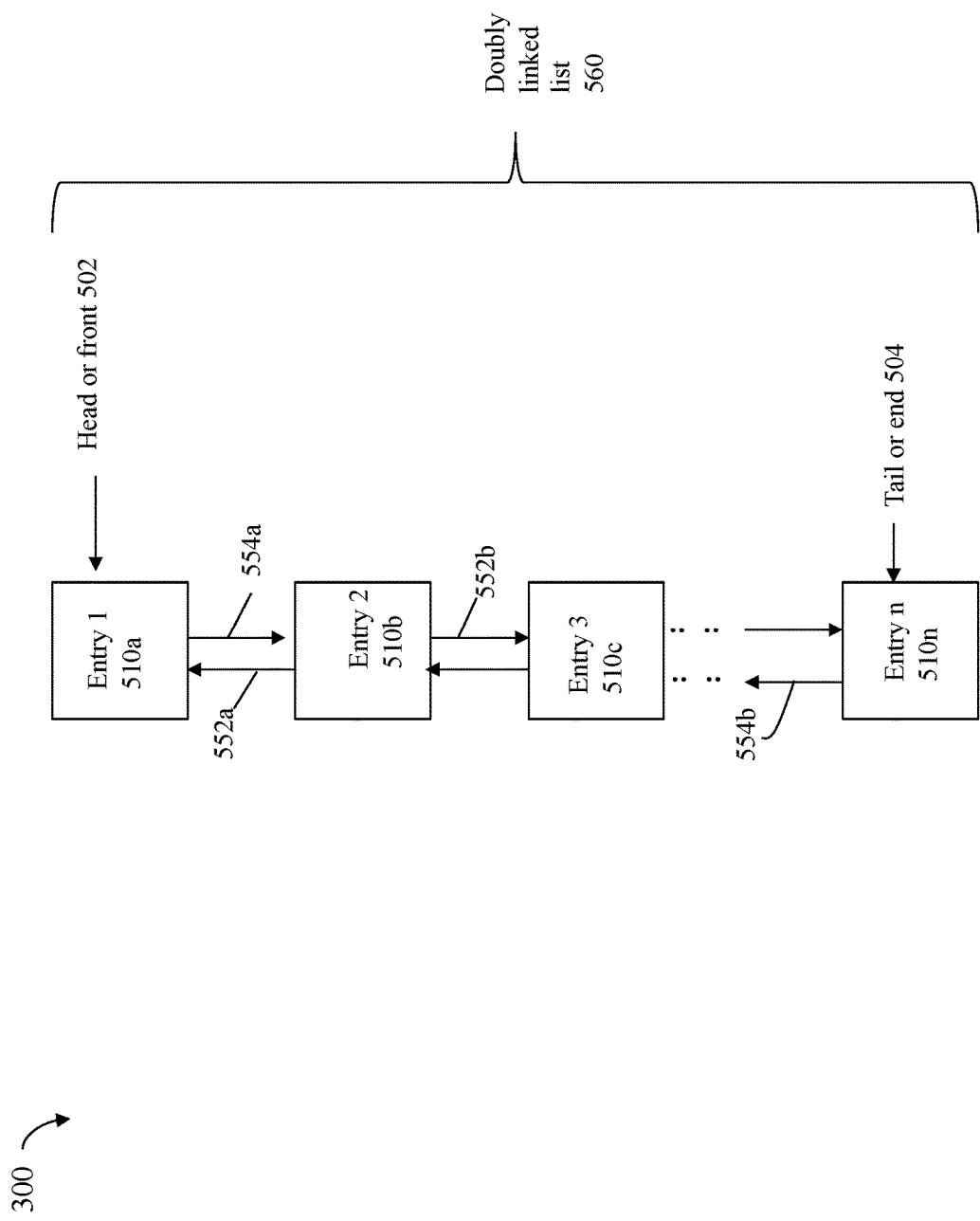
FIG. 4 is an example illustrating a double linked list of cache pages of a bucket that may be used in an embodiment in accordance with the techniques herein.

Referring to FIG. 4, shown is an example of a doubly linked list of cache locations that may be used in an embodiment in accordance with the techniques herein. Each entry in the list 560 denotes a cache page of a particular size. Thus, the list 560 includes multiple cache pages of the same size. The head or front pointer 502 may denote the head or front of the list, and thus the first entry in the list 560. The tail or end pointer 504 may denote the end or tail of the list, and thus the last entry in the list 560.

Each entry of the list 560, except the last current entry 510*n*, points to the next entry in the list. For example, entry 510*a* points to entry 510*b* as denoted by the arrow 552*a*.

In at least one embodiment, the list 560 of entries may be maintained so that the head or front pointer 502 points to the most recently used entry and the tail or end pointer 504 points to the least recently used entry of the list.

Whenever an existing entry of the list 560 is accessed, it may be moved to the head or front 502 of the list so that the most recently used entries are at the head or front of the list. Thus, the entries in the list 560 may appear from most recently used entries to least recently used entries by traversing the list 560 from the head or front 502 to the tail or end 504.

When adding a new entry to the list for a new data block being stored in the cache and there are no free entries, the current entry at the tail or end 504 is evicted in that it is overwritten with information for the new entry being inserted.

In the example 300 of the doubly linked list, each entry of the list 560, other than the first entry 510*a* and last entry 510*n*, include a forward pointer to the next entry and also include a backward pointer to the previous or prior entry in the list. For example, entry 510*b* includes a pointer 552*a* to the prior entry 510*a* and also includes a pointer 552*b* to the next entry 510*c* in the list 560. The first entry 510*a* currently at the head or front 502 of the list only includes a pointer 554*a* to the next entry 510*b* in the list 560. The last entry 510*n* currently at the tail or end 504 of the list only includes a pointer 554*b* to the previous or prior entry (not illustrated) in the list.

The following paragraphs describe embodiments in accordance with the techniques herein in which each section of cache pages of a particular size may be implemented using a doubly linked list as illustrated in the FIG. 4. More generally, the techniques herein may be used in connection with any suitable cache management technique and associated data structure(s) used to implement and manage each of the lists of entries of cache pages.

In at least one embodiment, a system page size may denote the size granularity of an uncompressed data chunk where the system page size is 8K bytes. A page may refer to a single unit or amount of memory located in the cache. In connection with the techniques herein, the cache may be implemented to include multiple cache page sizes. Various techniques may be used for general cache management (e.g., eviction policy for selecting data of cache pages for removal from the cache, flushing policy for determining when and/or how much write pending data to flush from the cache to the non-volatile storage, and the like). Based on embodiments in accordance with the techniques herein, the cache including multiple buckets or sections of cache pages may perform such processing for cache management based on multiple cache page sizes.

In at least one embodiment, the cache may be implemented using suitable form of memory or storage. For example, in at least one embodiment, the cache may include one or more of volatile RAM, non-volatile or persistent SCM (Storage Class Memory), and the like. As known in the art, SCM may be characterized as a storage or memory tier that is slightly slower than DRAM but provides for persistent data storage. The cache may be implemented using one or more caching tiers or layers, such as a primary caching tier or layer and a secondary caching tier or layer, where the primary tier or layer may be a form of memory that is relatively faster than the form of memory of the secondary caching tier or layer. The techniques herein may be used in connection with one or more of the caching tiers or layers in an embodiment.

In at least one embodiment, the system may have separate read and write caches for storing, respectively, only read I/O data and only write I/O data. In at least one embodiment, the techniques herein may be used in connection with the read cache but not the write cache. In such an embodiment, the write cache may be implemented as a log-based write cache where write data is sequentially written to a log-based device and then later destaged from the cache to the PDs. Once the write data is written to the log-based device, successful completion of the write I/O may be sent to the client, such as a host. The write cache may be implemented as a log in which each subsequent write I/O and write I/O data is recorded in a next logically sequential record of the log. The log may be circular in nature in that once a write is recorded in the last record of the log, recording of the next write proceeds with recording in the first record of the log.

In at least one embodiment, the techniques herein may be used in connection with one or more caches for storing both read and write I/O data. In such an embodiment, the write cache may be a non-log based write cache. In at least one such embodiment, the read and write data may be stored in the same cache managed and organized as described herein.

An embodiment may initially partition and also subsequently repartition the cache into sections or buckets. In connection with such partitioning and repartitioning, the total size or amount of cache allocated for each bucket may be based on one or more metrics, such as one or more metrics related to access frequency or cache activity level for each of the buckets. For example, assume there are 4 buckets with respectively associated cache page sizes (in bytes) of 8K 4K, 2K and 1K. Assume processing, such as based on one of the metrics, determines to equally divide the total cache among the 4 buckets. If the total cache size is 400 GB, each bucket may initially have a size of 100 GB. Thus the number of cache pages in each bucket will vary but the total overall size of each bucket is the same.

As a variation, an embodiment may partition and also reparation the cache into sections or buckets but where the number of cache pages or entries in each bucket is based on the one or more metrics. For example, assume there are 4 buckets with respectively associated cache page sizes (in bytes) of 8K 4K, 2K and 1K. The total cache size may be partitioned so that each bucket may initially include the same number of cache pages. Thus the number of cache pages in each bucket may be the same but the total overall size of each bucket of cache pages may vary.

For purposes of illustration, following examples may partition and repartition the cache based on the former based on the total size or amount of cache allocated for each bucket. Also, for purposes of illustration, the following examples may refer to an embodiment in which there are 4 buckets with respectively associated cache page sizes of 8K, 4K, 2K and 1K. However more generally any suitable number of buckets of different cache page sizes may be used in an embodiment in accordance with the techniques herein.

Figure 5:
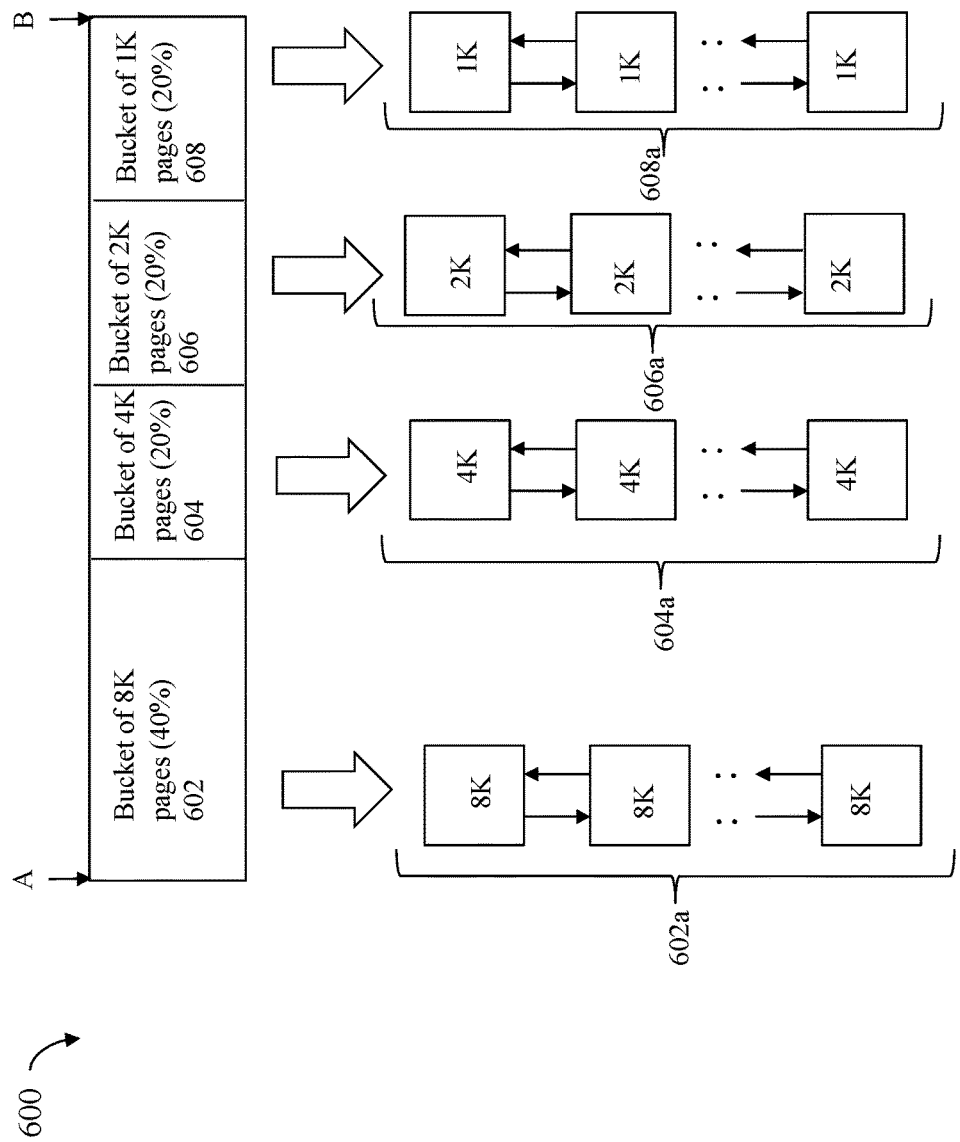

Referring to FIG. 5, shown is an example 600 illustrating an initial partitioning of the cache into multiple buckets of cache pages in an embodiment in accordance with the techniques herein. The example 600 includes 4 buckets 602, 604, 606 and 608 of cache pages, although an embodiment may generally include any suitable number of 2 or more buckets. Each of the buckets includes cache pages of an associated cache page size. Each of the buckets has a different associated cache page size. Each bucket may include only cache pages of the particular cache pages size associated with the bucket. Consistent with discussion elsewhere herein, each bucket is illustrated as a doubly linked list that may be managed and organized as described in connection with FIG. 4. However, more generally any suitable structure and management technique may be used.

The bucket 602 includes cache pages that are 8K bytes in size. Element 602a denotes the linked list of 8K byte size cache pages. The bucket 604 includes cache pages that are 4K bytes in size. Element 604a denotes the linked list of 4K byte size cache pages. The bucket 606 includes cache pages that are 2K bytes in size. Element 606a denotes the linked list of 2K byte size cache pages. The bucket 608 includes cache pages that are 1K bytes in size. Element 608a denotes the linked list of 1K byte size cache pages. More generally, any suitable cache page size or granularity may be associated with each bucket. In the example 600, a single page of uncompressed data may be 8K bytes in size. Thus, the bucket 602 may include uncompressed cache data pages. Data may be stored in its uncompressed form for one or more reasons, some of which are described herein. For example, the page of data may be accessed frequently (e.g., exceeding a specified threshold level) and it may be determined to store the page of data in its uncompressed form to avoid the latency incurred when decompressing the data. As another reason, processing may determine that the page of data is uncompressible or does not achieve at least a minimum level of compressibility (e.g., does not have a compression ratio exceeding a specified compression ratio threshold).

When storing compressed data, one of the buckets may be selected based on the size of the compressed data to accommodate storing the compressed data in the cache. For example, if a compressed page of data is 3.5K bytes in size, the compressed data is stored in a 4K bytes size cache page of the bucket 604. Generally, the cache page selected may be the smallest cache page size that the compressed page of data fits into. The cache page selected may be from a bucket having an associated cache page size that is the smallest of all available cache pages sizes that are equal to, or greater than, the size of the compressed page (e.g., compressed page=3.5K bytes, possible cache page sizes are 4K and 8K, where 4K, which is the smallest or minimum of these cache page sizes, is selected).

The initial partitioning of the cache into multiple buckets may determine an amount of the cache allocated for each bucket using any suitable technique. In the example 600, an initial partitioning may allocate 40% of the cache to bucket 602 and 20% of the cache to each of the buckets 604, 606 and 608.

At one or more subsequent points in time, the cache may be repartitioned among the buckets. The repartitioning may be dynamically performed and adjusted, for example, based on one or more cache activity level metrics or access frequency metrics determined for each bucket.

In at least one embodiment, the initial partitioning of the cache may be based on default settings. In at least one embodiment, the initial partitioning may be an approximately equal partitioning (e.g., within some specified tolerance) of the cache among different buckets of page sizes, or based on some other specified default partitioning such as illustrated in FIG. 5.

In at least one embodiment, the initial partitioning of the cache may be based on historical usage of collected data, such as based on the one or more metrics related to access frequency or cache activity per bucket that may be collected for the particular customer's system in which the cache is included. For example, such historical usage of collected data may indicate to partition the cache as follows as illustrated in the example 600: 40% for the 8K bucket, 20% for the 4K bucket, 20% for the 2K bucket, and 20% for the 1K bucket.

In at least one embodiment as described herein, the one or more metrics associated with each bucket that may be used in connection with partitioning the cache among the buckets may be based on the cache access frequency or cache activity level of each bucket. For example, an embodiment may determine and use one or more metrics for each bucket based on cache hits associated with each bucket.

In at least one embodiment, the one or more metrics for each bucket used to partition the cache among the buckets may include a cache hit ratio metric. The cache hit ratio may be expressed as a ratio of the number of cache hits with respect to the sum of the number of cache hits and the number of cache misses. For example, for 200 cache hits and 50 cache misses over a period of time, the cache hit ratio is 200/(200+50)=200/250=0.80 or 80%.

In at least one embodiment in which the techniques herein are used in connection with a cache storing both read and write I/O data, the cache hit ratio for each bucket of cache pages may be determined with respect to both reads and writes directed to cache pages of the bucket. Consistent with other discussion herein, a read hit with respect to a cache page means the desired read data of the page is present in the cache, a read miss means the desired read data of the page is not in the cache, a write hit means the cache contains an existing copy or current version of the write data that is now being overwritten by the write, and a write miss means the cache does not contain an existing copy or current version of the write data that is now being overwritten by the write. Thus, the cache hit ratio in such an embodiment may be expressed as a ratio of the number of cache hits (both read hits and write hits) with respect to the sum of the number of cache hits (both read hits and write hits) and the number of cache misses (both read misses and write misses).

As a variation in at least one embodiment in which the techniques herein are used in connection with a cache storing only read I/O data but not write I/O data, the cache hit ratio for each bucket of cache pages may be determined with respect to only reads and not writes directed to cache pages of the bucket. In such an embodiment, the cache hit ratio may be expressed as a ratio of the number of cache hits (read hits only) with respect to the sum of the number of cache hits (read hits only) and the number of cache misses (read misses only).

In at least one embodiment, the one or more metrics may include the cache hit ratio as described herein. In at least one embodiment, the one or more metrics may include a normalized form of the cache hit ratio for a bucket where the calculated cache hit ratio for the bucket is further divided by the size or amount of storage of the bucket. For example, in such an embodiment, the normalized form of the cache hit ratio for the bucket may be determined as the cache hit ratio for the bucket divided by the number of megabytes (MBs) of cache allocated for the bucket.

In at least one embodiment, the one or more metrics for each bucket may include the number of cache hits for the bucket divided by the size or amount of storage of the bucket. For example, in such an embodiment, the metric for the bucket may be determined as the number of cache hits for the bucket divided by the number of megabytes (MBs) of cache allocated for the bucket. In an embodiment in which the techniques herein are used in connection with a cache storing only read I/O data but not write I/O data, the number of cache hits for a bucket refers to the number of read hits only for reads directed to data stored in the bucket. In an embodiment in which the techniques herein are used in connection with a cache storing both write and read I/O data, the number of cache hits for a bucket refers to the sum of the number of read hits and the number of write hits for I/Os directed to data stored in the bucket.

Subsequent to the initial partitioning of the cache among the buckets such as illustrated in FIG. 5, an embodiment may periodically perform processing to determine whether to resize or repartition the cache among the buckets based on one or more metrics. In at least one embodiment, at least one of the metrics may be based on an access frequency or activity level of each bucket, such as those described herein. In at least one embodiment, the higher the access frequency associated with a bucket, the larger the size or amount of cache that may be allocated for use with the bucket. Similarly the lower the access frequency associated with a bucket, the smaller the size or amount of cache that may be allocated for use with the bucket.

To further illustrate, consider the 4 buckets with respectively associated cache page sizes of 8K, 4K, 2K and 1K as noted above and illustrated in FIG. 5. Subsequent to the initial partitioning of the cache among the buckets as illustrated in FIG. 5, processing may be performed to evaluate whether to repartition or resize the cache among the buckets based on one or more metrics. Assume at the time of repartitioning the cache that the 3 buckets of 8K, 4K and 1K pages have approximately (e.g., with specified tolerance or limits) the same access frequency as determined bucket level access frequency metrics but the bucket of 2K pages has a much higher access frequency that the other 3 buckets. In this case, the amount of cache allocated to the 2K page size bucket (2K bucket) may be increased to be more than all remaining buckets. The additional amount of cache allocated to the 2K bucket may be obtained by reducing the amount of cache allocated for one or more of the other remaining buckets. For example, assume that all 4 buckets currently have current cache allocations prior to the repartitioning as in FIG. 5 with the 8K bucket 602 allocated 40% of the cache with each of the remaining 3 buckets allocated each 20% of the cache. In this case as part of the repartitioning, an equal amount of cache may be reallocated from each of the 1K, 4K and 8K buckets for use by the 2K bucket having the relatively higher access frequency. For example, assuming processing increases the 2K bucket's allocation by N bytes, ⅓ of the N bytes may be allocated from each of the remaining 3 buckets.

As a variation, assume at the time of cache repartitioning that the buckets of 8K and 4K pages have approximately (e.g., with specified tolerance or limits) the same access frequency but the bucket of 2K pages has a much higher access frequency than any other bucket, and the bucket of 1K pages has a much lower access frequency than any other bucket. In this case, processing may be performed to reallocate a portion of the cache from the 1K bucket of pages to the 2K bucket of pages without modifying the amount of cache allocated for use by the 8K and 4K buckets.

As noted above, when a decision is made to increase the cache allocation of a first particular bucket, the additional cache allocated to the first bucket may be obtained by decreasing the cache allocation of one or more other buckets. The one or more other buckets may also be referred to as cache donor buckets, or donor buckets. The first bucket having the increased in cache allocation may be characterized as a cache receiver bucket or receiver bucket.

In at least one embodiment the one or more donor buckets selected may be logically configured in the cache immediately adjacent to, or consecutively located next to, the receiver bucket. In this manner, the cache may be logically partitioned into consecutive buckets where all the cache of each single bucket may correspond to a logically consecutive subrange or portion of the cache. Thus the candidate donor buckets may be one or more tiers that are logically adjacent to the receiver bucket. The access frequency metrics for the candidate donor buckets may be used to select one or more of the candidates from which to donate additional cache to the receiver bucket. For example, with reference to FIG. 5, the elements 602, 604, 606 and 608 may denote logically consecutive buckets of cache pages, where A may denote the starting logical cache location and B may denote the ending logical cache location. The logical cache address range from A to B denotes a sequential consecutive range of such addresses. In the example 600, the 2K bucket is logically adjacent to both the 4K bucket and the 1K bucket but is not logically adjacent to the 8K bucket. Assume the 2K bucket has the highest relative access frequency of all the buckets, and that all other buckets have approximately (e.g., within a specified tolerance or amount) the same access frequency that is lower than that of the 2K bucket. In this case, the candidate donor buckets are the 1K and 4K buckets. Since the access frequencies of the donor buckets are approximately the same, processing may select both the 1K and 4K buckets as donor buckets. To increase the amount of cache of the 2K bucket by N bytes, collectively the 1K and 4K buckets may be decreased by N bytes. Since both the 1K and 4K buckets have approximately the same access frequency, ½ of the N additional bytes allocated to the 2K bucket may be obtained from each of the 2 donor buckets. It should be noted that any reallocation from a particular donor bucket may be approximate due to the varying cache pages sizes of the buckets. As a variation, if the access frequency of the 4K bucket is much less than the 1K bucket, the 4K bucket may be selected as the sole donor bucket from which the N bytes of cache are reallocated to the 2K bucket.

In at least one embodiment, each bucket may not have all its allocated cache in a logically consecutive subrange or portion of the cache. In such an embodiment, the cache portions allocated to a single bucket may be logically located in contiguous or non-contiguous logical cache locations. Each of the cache portions may have a minimum size, such as 1 MB (megabyte) or 2 MB. Thus cache may be reallocated from multiple donor buckets to a receiving bucket in portions or chunks that are at least the minimum size. In such an embodiment, the candidate donor buckets generally be any of the other buckets having an access frequency less than the receiving bucket. In such an embodiment, the additional N bytes added to the receiving bucket may be obtained from any of the other candidate donor buckets in chunks that are at least the minimum size.

Figure 6A:
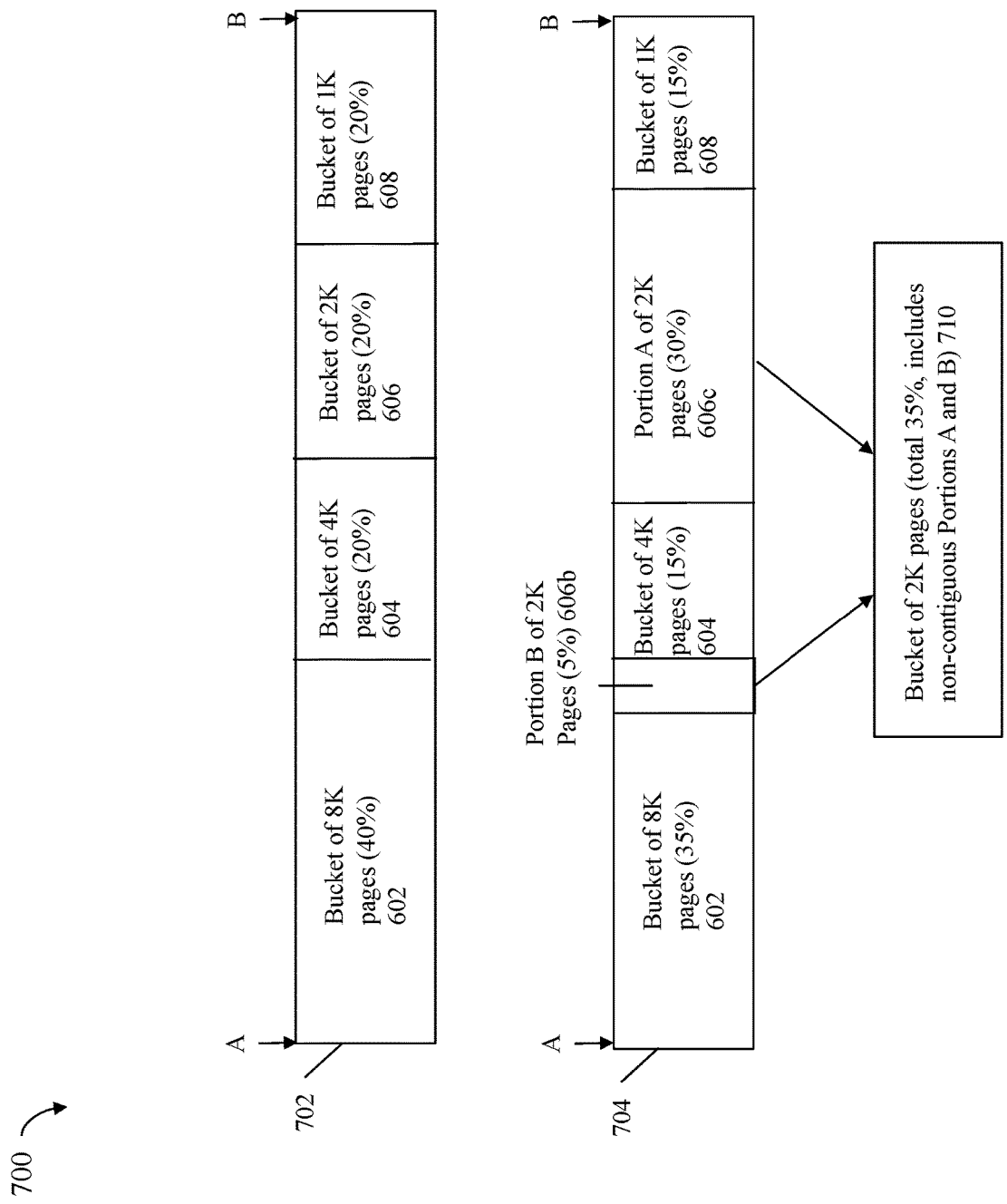
FIG. 6A is an example illustrating reallocation of cache pages from multiple donor buckets to a single receiving bucket in an embodiment in accordance with the techniques herein.

To further illustrate an embodiment where each bucket may not have all its allocated cache in a logically consecutive subrange or portion of the cache, reference is made to FIG. 6A. In the example 700, element 702 may denote the current cache allocations among the 4 buckets consistent with that as described above in connection with FIG. 5. Assume now that processing is performed to repartition the cache among the buckets and processing determines that the 2K bucket 606 is to have its cache allocation increased and that equal amounts of cache are repartitioned from donor buckets 602, 604 and 608 for use by the bucket 606. In this example 700, assume that processing is performed to increase the allocation of the receiving bucket 606 (of 2K cache pages) by 15% to a total of 35%, where 5% of the increased cache allocation is donated from each of the 3 donor buckets 602, 604 and 608. Element 704 shows the resulting allocations once the repartitioning is completed where the bucket 602 has its allocation decreased from 40% to 35%, the bucket 604 has its allocation decreased from 20% to 15%, and the bucket 608 has its allocation decreased from 20% to 15%. Element 606c may denote a first cache portion A of 2K pages that includes the 5% increased allocation from each of the donor buckets 604 and 608. In this example, the donor buckets 604 and 608 are logically adjacent and consecutive to the receiving 2K bucket. Element 606b denotes a second cache portion B of 2K pages that includes the 5% cache portion donated by bucket 602 to the receiving bucket of 2K pages. Thus, after repartitioning, element 710 denotes that the bucket of 2K pages in the cache includes a total of 35% of the cache. The bucket of 2K pages 710 includes logically non-contiguous cache portions A 606b and B 606c. In a similar manner although not illustrated in the FIG. 6A, after further repartitioning, the bucket 710 of 2K pages may further include additional non-contiguous cache portions. Additionally although not illustrated in the FIG. 6A, after further repartitioning, one or more of the other buckets 602 (8K pages), 604 (4K pages) and 606 (1K pages) may also include additional cache portions that are not contiguously located within the cache.

In at least one embodiment and consistent with discussion elsewhere herein, data stored in the cache may include both compressed and uncompressed forms of cached data. Whether data of a page is stored in the cache in its compressed or uncompressed form may be determined in accordance with the activity or frequency of access of the page, such as may be determined using one or more metrics described herein. For example, a threshold level of frequency or activity may be specified. If the access frequency or activity level of a page is above the threshold, the page may be stored in the cache in its uncompressed form. If the access frequency or activity level of the page is below the threshold, the page may be stored in the cache in its compressed form. The foregoing may be used to avoid incurring the additional decompression latency for the "hottest" or frequently accessed pages. The access frequency or activity level of a page used when determining whether to store the page in the cache in compressed or uncompressed form may be one of the metrics described herein, or more generally, any suitable metric.

Generally, an embodiment may use any suitable technique to select one or more receiving buckets and one or more donor buckets. As described herein, in at least one embodiment, the receiving and donor buckets may be selected based on one or more metrics for each bucket, such as one or more access frequency or cache activity level metrics. For example, using one of more of the metrics such as those described herein, the donor bucket may be the bucket with the lowest access frequency and the receiving bucket may be the bucket with the highest access frequency.

Any suitable technique may be used to select the particular pages of a donor bucket to be donated to a receiving bucket. In such a case, data stored in the donated cache pages may be evicted from the cache. In at least one embodiment, pages of the donor bucket may ranked based on the last or most recent access time. The least recently used or accessed pages of the donor bucket may be evicted prior to other pages that are more recently used or accessed. Thus, cache pages of a donor bucket may be reclaimed in order of least recently used until the desired amount of cache is reclaimed from the donor bucket. For example, to reclaim 10K of cache from the 1K bucket as the donor bucket, processing may select the 10 least recently used pages from the 1K bucket. The 10 cache pages of the 10 evicted pages of the 1K donor bucket may be reallocated to a receiving bucket.

In connection with another technique for selecting cache portions or pages within a donor bucket for reallocation to a receiving bucket, logically consecutive cache pages in a bucket may be grouped together into larger reallocation chunks each having a granularity size that is larger than any of the cache pages sizes of the buckets. For example, consider an embodiment in which cache portions may be allocated for each bucket in chunks that are at least a minimum size, such as 1 MB or 2 MB as described elsewhere herein in an embodiment in which cache portions of a bucket may be logically non-contiguous. The minimum size may also be referred to as the reallocation granularity size of a reallocation chunk. For each bucket, a ranking based on a last or most recent access time determined for reallocation chunks each having a size that is equal to the reallocation granularity size.

Since each reallocation chunk includes multiple cache pages, the reallocation chunk may have an access time determined collectively in accordance with the last or most recent access times of all the cache pages included in the reallocation chunk. For example, in at least one embodiment, a reallocation chunk may have an access time determined as an average of the last or most recent access times of all the cache pages included in the reallocation chunk. In this manner, processing may be performed to select what cache portions of a donor bucket are donated to the receiving bucket based on the access times of the larger reallocation chunks of the bucket. For example, the reallocation chunks having the oldest access times (e.g., least recently used access times) may be selected for donation to the receiving bucket prior to other reallocation chunks having more recent access times. In this manner, repartitioning may reallocate cache from a donor bucket to a receiving bucket in chunks of the reallocation granularity size. In connection with such an embodiment, processing may select reallocation chunks for donation from a donor bucket based on an access frequency metric for the reallocation chunk. The access frequency metric may be, for example, the average access time as noted above, or based on any other suitable access frequency or activity level metric, some of which are described herein in connection with bucket level access frequency or activity level metrics. For example, each reallocation chunk may have an access frequency metric based on the cache hits associated with the reallocation chunk. Consistent with other discussion herein, in at least one embodiment the metric may be the number of cache hits divided by the size of the reallocation chunk.

Figure 6B:
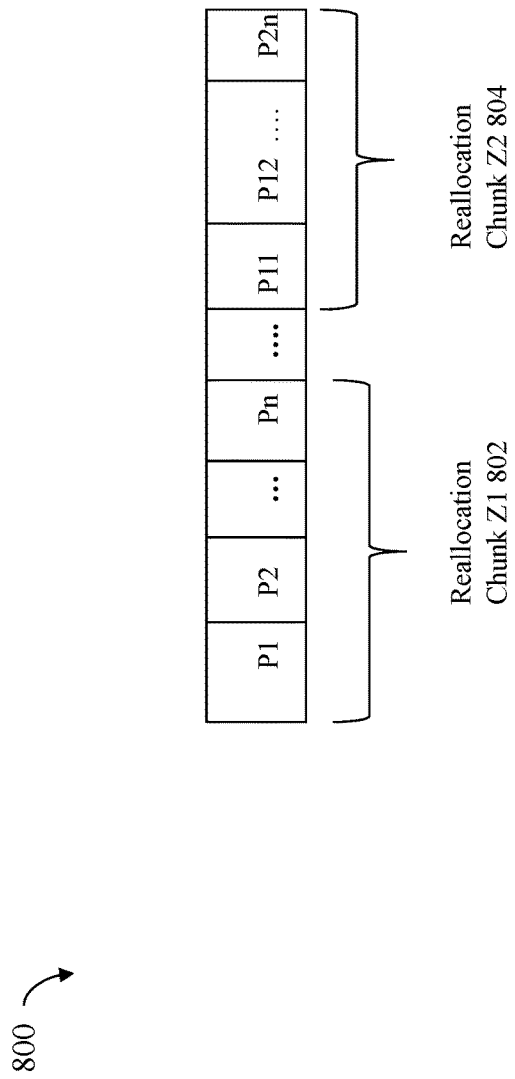
FIG. 6B is an example illustrating reallocation chunks formed from multiple logically consecutive pages of a bucket in an embodiment in accordance with the techniques herein.

Referring to FIG. 6B, shown is an example 800 illustrating logically consecutive groupings of cache pages of a single bucket into reallocation chunks. Each of the segments labeled Pi, where "i" is an integer greater than 0, in FIG. 6B denotes a different cache page allocated for a bucket of cache pages. In this example, reallocation chunk Z1 802 includes cache pages P1 through Pn and reallocation chunk Z2 includes cache pages P11 through P2n. Consistent with discussion elsewhere herein, each of the reallocation chunks, such as 802 and 804, of a bucket may denote a chunk or unit of cache pages that may be reallocated between buckets. The size of each reallocation chunk may be same across all the buckets. The number of cache pages included in a reallocation chunk of different buckets may vary with the size of the cache page size of each bucket.

An embodiment may determine that repartitioning and reallocation of the cache among the buckets is needed upon the occurrence of one or more trigger conditions. For example, in at least one embodiment, processing may be performed periodically to determine whether one of the trigger conditions has occurred. If so, then processing may be performed as described herein to repartition or reallocate the cache among the buckets. For example, the trigger conditions may include determining whether the access frequency or activity levels of the buckets are approximately the same (e.g., within a specified tolerance or amount) or otherwise exceeds a specified threshold of allowable variation or difference. In at least one embodiment, the frequency or activity of each of the buckets may be determined using one or more metrics as described herein. For example, one metric used may be based on the cache hits of each of the buckets of cache pages. If the metric values indicate that the activity level or access frequency of all the buckets is not approximately the same within a specified threshold of allowable variation or difference, then processing may be performed as described herein to repartition or reallocate the cache among the buckets. The specified threshold of allowable variation or difference may be, for example, that the values of the metric for the buckets not exceed a specified variance or number of standard deviations with respect to the mean of the values. For example, an embodiment may indicate that all metric values for the buckets should be within 2 standard deviations (+/−2 standard deviations) with respect to the mean of such values. If not, then a trigger condition is detected that triggers repartitioning and reallocation of the cache among the buckets.

Generally, an embodiment may use any suitable technique to determine an amount of cache to reallocate to a receiving bucket. For example, an embodiment may determine the amount of cache to reallocate to the receiving bucket based on the one or more access frequency metrics of the buckets. For example, an embodiment may determine an amount to reallocate to a receiving bucket based on the amount by which the receiving bucket's metric value exceeds a specified threshold condition, such as exceeds a specified variance or number of standard deviations with respect to the mean of the metric values for the buckets.

Generally, an embodiment may use any suitable technique to determine an amount of cache to reallocate from a donor bucket. For example, an embodiment may determine the amount of cache to reallocate from the donor bucket based on the one or more access frequency metrics of the buckets. For example, an embodiment may determine an amount to reallocate from a donor bucket based on the amount by which the donor bucket's metric value falls below a specified threshold condition, such as falls below a specified variance or number of standard deviations with respect to the mean of the metric values for the buckets.

In at least one embodiment, the access frequency metric for a bucket that may refer to the number of pages in the bucket having a per page access at or below a minimum threshold denoting a minimum number of cache hits (read and/or write hits) with respect to the bucket within a time period during which the metric is measured. For example, the minimum threshold may be selected as 0 hits within a time period. This access frequency metric may be used to identify a donor bucket as well as the donor pages of that bucket. For this metric, the number of cache hits per page may be maintained as well as the total number of pages per bucket having a number of cache hits equal to the threshold of 0 cache hits. Consider, for example, a bucket 1 with 100 pages where 10 pages of the bucket 1 each have an access frequency of 1000 and the remaining 90 pages are idle or have an access or hit frequency of 0. Also consider a bucket 2 with 100 pages and each of the 100 pages has a number of accesses or hits of 10; and a bucket 3 with 100 pages where 90 pages each having an access or hit frequency of 5, and where 10 pages each having an access or hit frequency of 0. For this per bucket access frequency metric, bucket 1 has a value of 90 since it has 90 pages with a per page access of 0, bucket 2 has a value of 0, and bucket 3 has a value of 10. The value of the access frequency metric with respect to the 3 buckets may not be within specified limits. For example, the metric value for bucket 1 may exceed or vary beyond a specified tolerance when compared to the metric values for buckets 2 and 3. As a result, processing may determine to repartition the cache among the 3 buckets. In connection with repartitioning, the 3 buckets may be ranked based on the bucket's access frequency metric, from highest to lowest, where the bucket with the highest metric value may be selected as the donor bucket and the bucket with the lowest metric value selected as the receiving bucket. In this example, the buckets may be ranked based on the bucket having the highest metric value to the lowest metric value as follows: bucket 1 (metric value=90), bucket 3 (metric value=10), bucket 2 (metric value=0). In this case, bucket 1 is identified as a donor bucket since it has 90 pages with a per page access of 0. Additionally, since there are 90 pages with the access frequency of 0, the particular 90 pages, or some portion of thereof, having the per page access of 0 may be selected from bucket 1 as the particular pages to be donated to a receiving bucket. Bucket 2 may be selected as the receiving bucket since it has the lowest metric value. In this example, 90 pages or some portion of the 90 pages having a per page access of 0 may be selected from bucket 1 and donated to bucket 2.

In the above example, the buckets have the same number of pages. In at least one embodiment in which the number of pages per bucket may vary, the per bucket metric may be normalized in any suitable manner. For example, an embodiment may normalize the metric as a percentage or ratio based on the number of pages in each bucket (e.g., number of pages in the bucket having a per page number of cache hits or accesses of 0 with respect to the total number of pages in the bucket).

In at least one embodiment, a per page number of cache hits or accesses may be maintained to determine a ranked list of donor pages independent of buckets including the pages. To further illustrate, consider the above example with 3 buckets. A list of ranked pages may be maintained based on the number of cache hits or accesses for each page in a particular time period. Donor pages may be determined as those pages having an access frequency or number of cache hits equal to 0. Some or all of the donor pages having an access frequency or number of cache hits equal to 0 may be donated to one or more receiving buckets. A receiving bucket may be selected in any suitable manner. For example, the receiving bucket may be selected as a bucket in which none of the pages in the bucket have an access frequency or number of cache hits of 0 in a time period during which the metric is measured. As another example, more generally, a receiving bucket may be selected as a bucket in which at least a specified number, or percentage, of pages in the bucket have an access frequency or number of cache hits greater than a specified threshold during a time period during which the metric is measured. What will now be described are flowcharts of processing steps described in more detail above that may be performed in an embodiment in accordance with the techniques herein.

Figure 7:
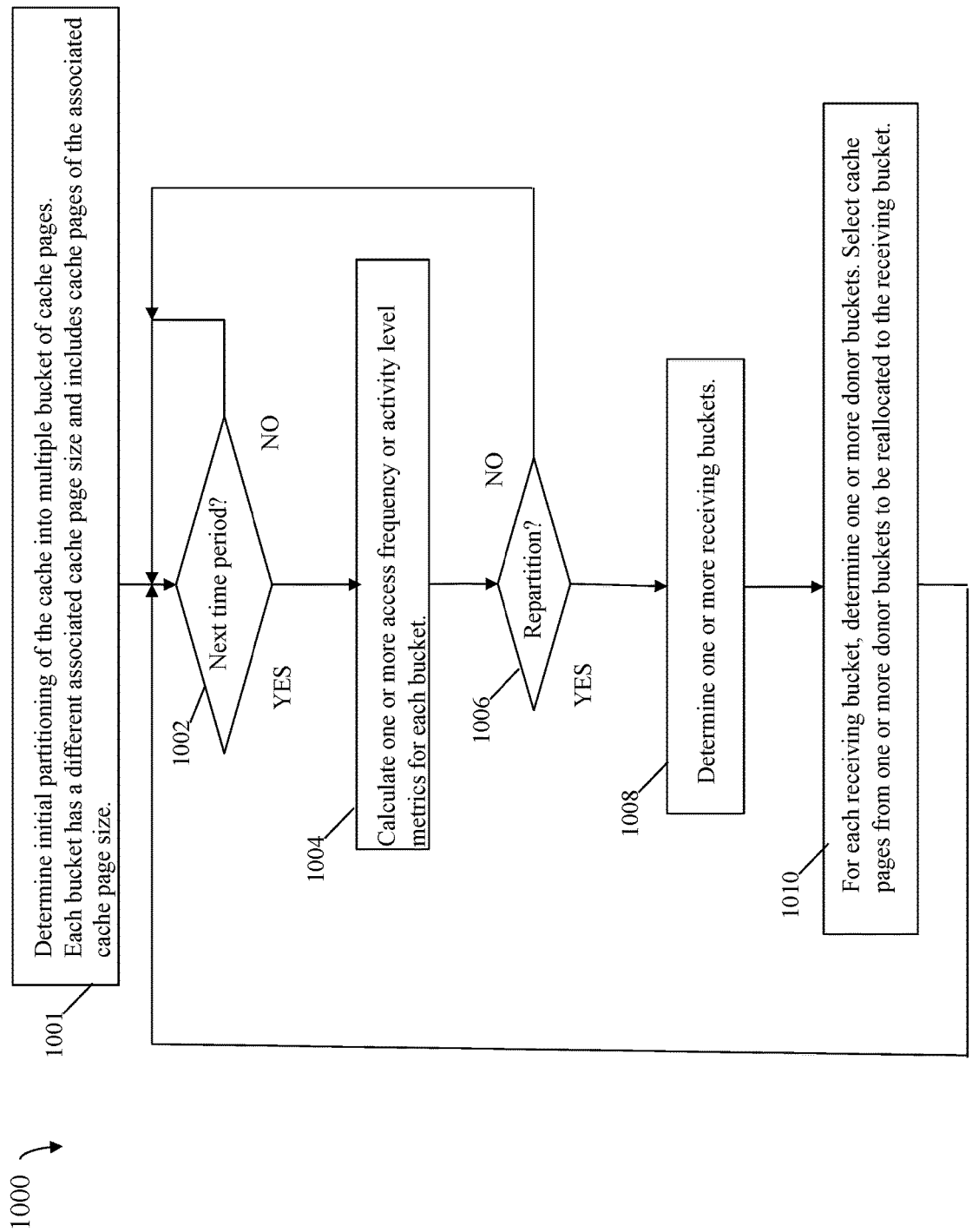
FIGS. 7 and 8 are flowcharts of processing steps that may be performed in an embodiment in accordance with the techniques herein.

Referring to FIG. 7, shown is a first flowchart 1000 of processing steps that may be performed in an embodiment in accordance with the techniques herein.

At the step 1001, an initial partitioning of the cache into multiple bucket of cache pages is performed. Each bucket has a different associated cache page size and includes cache pages of the associated cache page size. From the step 1001, control proceeds to the step 1002.

At the step 1002, a determination is made as to whether the next time period has elapsed. If not, the step 1002 evaluates to no and control remains at the step 1002 until the step 1002 evaluates to yes. If the step 1002 evaluates to yes, control proceeds to the step 1004.

At the step 1004, processing is performed to calculate one or more access frequency or activity level metrics for each bucket. The values for the metrics of the buckets may be determined, for example, based on cache hits observed during the most recently elapsed time period. From the step 1004, control proceeds to the step 1006. At the step 1006, a determination is made as to whether to repartition the cache among the multiple buckets of cache pages. If the step 1006 evaluates to no, control proceeds to the step 1002. If the step 1006 evaluates to yes, control proceeds to the step 1008.

At the step 1008, processing may be performed to determine one or more receiving buckets. From the step 1008, control proceeds to the step 1010. At the step 1010, for each receiving bucket, one or more donor buckets may be determined. The step 1010 may include selecting cache pages from the one or more donor buckets to be reallocated to the receiving bucket. From the step 1010, control proceeds to the step 1002.

Figure 8:
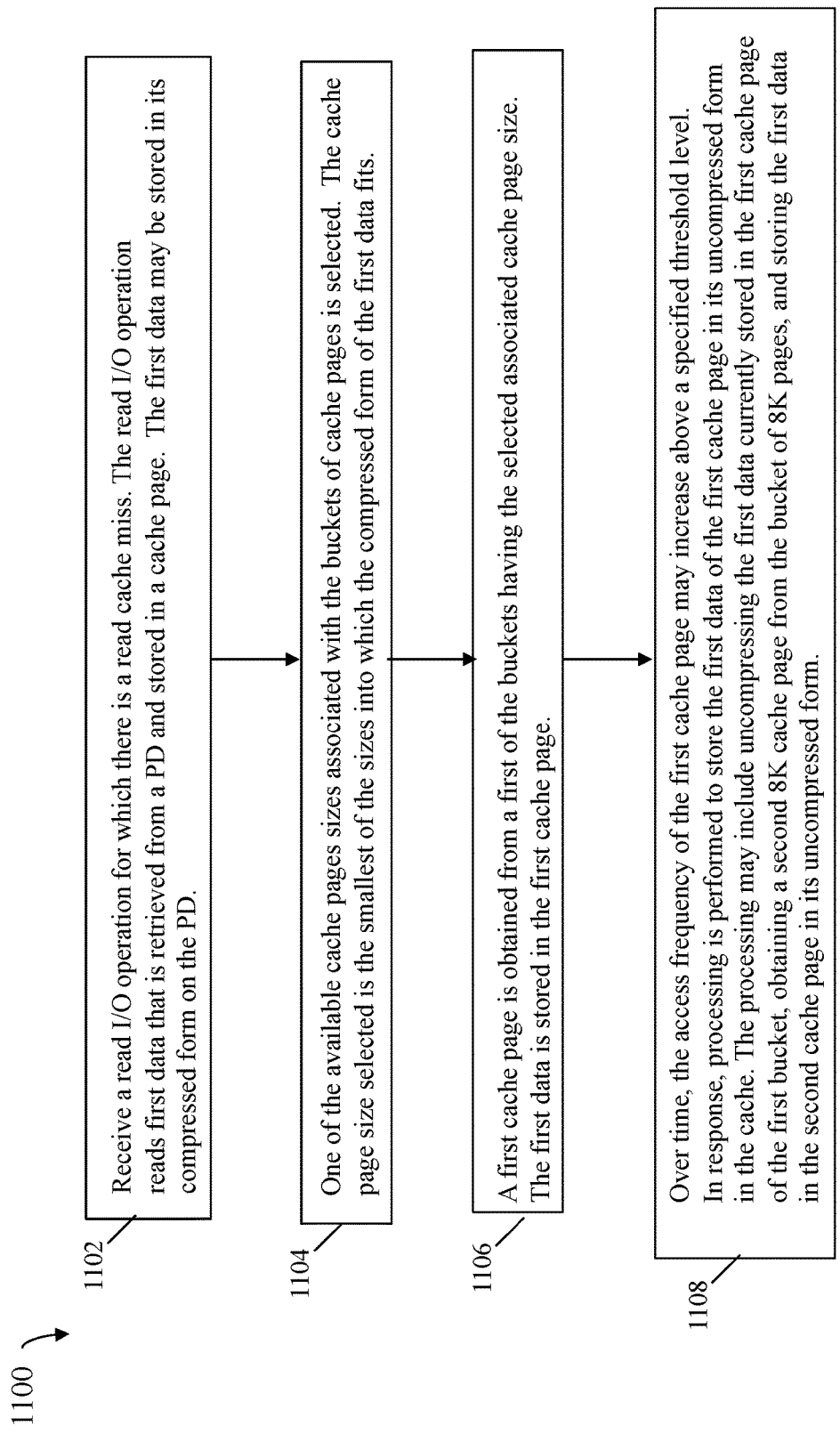

Referring to FIG. 8, shown is a second flowchart 1100 of processing steps that may be performed in an embodiment in accordance with the techniques herein. The processing of FIG. 8 may be performed, for example, in connection with storing read data into the cache where the read data may be obtained from one or more PDs.

At the step 1102, a read operation may be received for which there is a read cache miss. The read I/O operation may read first data that is retrieved from a PD and stored in a cache page. The first data may be stored in its compressed form on the PD. From the step 1102, control proceeds to the step 1104.

At the step 1104, one of the available cache pages sizes associated with the buckets of cache pages is selected. The cache page size selected may be the smallest of the cache page sizes into which the compressed form of the first data fits. From the step 1104, control proceeds to the step 1106 where a first cache page is obtained from a first of the buckets having the selected associated cache page size. The first data is stored in the first cache page. From the step 1106, control proceeds to the step 1108.

At the step 1108, over time, the access frequency of the first cache page may increase above a specified threshold level. In response, rather than store the compressed form of the first data in the cache, processing may be performed to store the first data of the first cache page in its uncompressed form in the cache. The processing may include uncompressing the first data currently stored in the first cache page of the first bucket, obtaining a second cache page that is a full size or system page size (e.g., 8K) cache page from the bucket of full size or system page size cache pages, and storing the first data in the second cache page in its uncompressed form. In the particular embodiment described herein, 8K is the system page size or full page size. More generally, as described herein, the system page size or full page size may be any suitable size that may vary with embodiment.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method for cache management comprising:
    partitioning a cache into a plurality of buckets of cache pages, wherein each of the plurality of buckets has an associated cache page size and said each bucket includes a plurality of cache pages each of the associated cache page size for said each bucket, wherein the cache includes compressed pages of data and uncompressed pages of data; and
    performing processing that stores a first page of data in the cache, said processing including:
        storing the first page of data in a first cache page of a selected bucket of the plurality of buckets having a first associated cache page size determined in accordance with a first compressed size of the first page of data.

2. The method of claim 1, further comprising:
    receiving at least one access frequency metric for each of the plurality of buckets;
    determining, in accordance with the at least one access frequency metric for each of the plurality of buckets, whether to repartition the cache among the plurality of buckets; and
    responsive to determining to repartition the cache among the plurality of buckets, performing cache repartitioning, wherein said cache repartitioning includes reallocating at least a first portion of the cache from a first of the plurality of buckets to a second of the plurality of buckets in accordance with the at least one access frequency metric for each of the plurality of buckets.

3. The method of claim 2, wherein said cache repartitioning comprises:
    determining the first bucket as a donor bucket from which the first portion of the cache is selected; and
    determining the second bucket as a receiving bucket to which the first portion of the cache is reallocated from the first bucket.

4. The method of claim 3, wherein said determining whether to repartition the cache further comprises:
    determining a first access frequency metric for the first bucket of cache pages exceeds a specified threshold of allowable variation or difference; and
    responsive to determining the first access frequency metric for the first bucket of cache pages exceeds the specified threshold of allowable variation or difference, determining to repartition the cache among the plurality of buckets and performing said cache repartitioning.

5. The method of claim 4, further comprising:
    determining that the first access frequency metric indicates that the first bucket has a lower access frequency than any other of the plurality of buckets.

6. The method of claim 3, wherein said determining whether to repartition the cache further comprises:
    determining a second access frequency metric for the second bucket of cache pages exceeds a specified threshold of allowable variation or difference; and
    responsive to determining the second access frequency metric for the first bucket of cache pages exceeds the specified threshold of allowable variation or difference, determining to repartition the cache among the plurality of buckets and performing said cache repartitioning.

7. The method of claim 6, further comprising:
    determining that the second access frequency metric indicates that the second bucket has a higher access frequency than any other of the plurality of buckets.

8. The method of claim 2, wherein the first portion of the cache is determined as a least recently used cache portion of the first bucket.

9. The method of claim 2, wherein each of the plurality of buckets has a different associated cache page size.

10. The method of claim 9, wherein the plurality of buckets includes one bucket of cache pages including the uncompressed pages of data, wherein other ones of the plurality of buckets of cache pages are used to store the compressed pages of data, and wherein the other ones of the plurality of buckets include different sizes of compressed cache pages.

11. The method of claim 10, wherein said processing that stores a first page of data in the cache further comprises:
    determining whether an associated access frequency for the first page of data exceeds a threshold;
    responsive to determining the associated access frequency for the first page of data exceeds the threshold, storing the first page of data in a cache page of said one bucket of cache pages used to store the uncompressed pages of data; and
    responsive to determining the associated access frequency for the first page of data does not exceed the threshold, performing said storing the first page of data in the first cache page of the selected bucket of the plurality of buckets having the first associated cache page size determined in accordance with the first compressed size of the first page of data, wherein the selected bucket is one of the other ones of the plurality of buckets.

12. The method of claim 2, wherein the at least one access frequency metric for each of the plurality of buckets is determined in accordance with cache hits of said each bucket of cache pages.

13. The method of claim 12, wherein the at least one access frequency metric for each of the plurality of buckets is determined by dividing the cache hits of said each bucket by a size of said each bucket denoting an amount of the cache allocated for said each bucket.

14. The method of claim 1, wherein the cache is a read cache that includes only read data for read I/O operations.

15. The method of claim 14, wherein a write cache that is separate from the read cache is used to store write data for write I/O operations.

16. The method of claim 1, wherein the cache includes data used in connection with read and write I/O operations.

17. The method of claim 2, wherein the at least one access frequency metric for each of the plurality of buckets includes a first access frequency metric determined in accordance with a number of pages in said each bucket having a number of cache hits or accesses below a specified threshold number of cache hits or accesses, and wherein the first bucket of the plurality of buckets has a maximum value for the first access frequency metric with respect to said plurality of buckets and wherein the first bucket is selected as a donor bucket from which the first portion of the cache is selected, and wherein the second bucket of the plurality of buckets has a minimum value for the first access frequency metric with respect to said plurality of buckets and wherein the second bucket is selected as a receiving bucket to which the first portion of the cache is reallocated.

18. The method of claim 2, wherein the cache includes a plurality of pages partitioned into the plurality of buckets, and wherein the method further comprises:
- receiving at least one access frequency metric for each of the plurality of pages;
- determining, in accordance with the at least one access frequency metric for each of the plurality of pages, a first portion of the plurality of pages to select as a plurality of donor pages;
- determining one or more receiving buckets; and
- moving the plurality of donor pages to the one or more receiving buckets.

19. A system comprising:
- at least one processor; and
- at least one memory comprising code stored thereon that, when executed, performs a method for cache management comprising:
  - partitioning a cache into a plurality of buckets of cache pages, wherein each of the plurality of buckets has an associated cache page size and said each bucket includes a plurality of cache pages each of the associated cache page size for said each bucket, wherein the cache includes compressed pages of data and uncompressed pages of data; and
  - performing processing that stores a first page of data in the cache, said processing including:
    - storing the first page of data in a first cache page of a selected bucket of the plurality of buckets having a first associated cache page size determined in accordance with a first compressed size of the first page of data.

20. A non-transitory computer readable medium comprising code stored thereon that, when executed, performs a method for cache management comprising:
- partitioning a cache into a plurality of buckets of cache pages, wherein each of the plurality of buckets has an associated cache page size and said each bucket includes a plurality of cache pages each of the associated cache page size for said each bucket, wherein the cache includes compressed pages of data and uncompressed pages of data; and
- performing processing that stores a first page of data in the cache, said processing including:
  - storing the first page of data in a first cache page of a selected bucket of the plurality of buckets having a first associated cache page size determined in accordance with a first compressed size of the first page of data.

* * * * *